Figure 2:
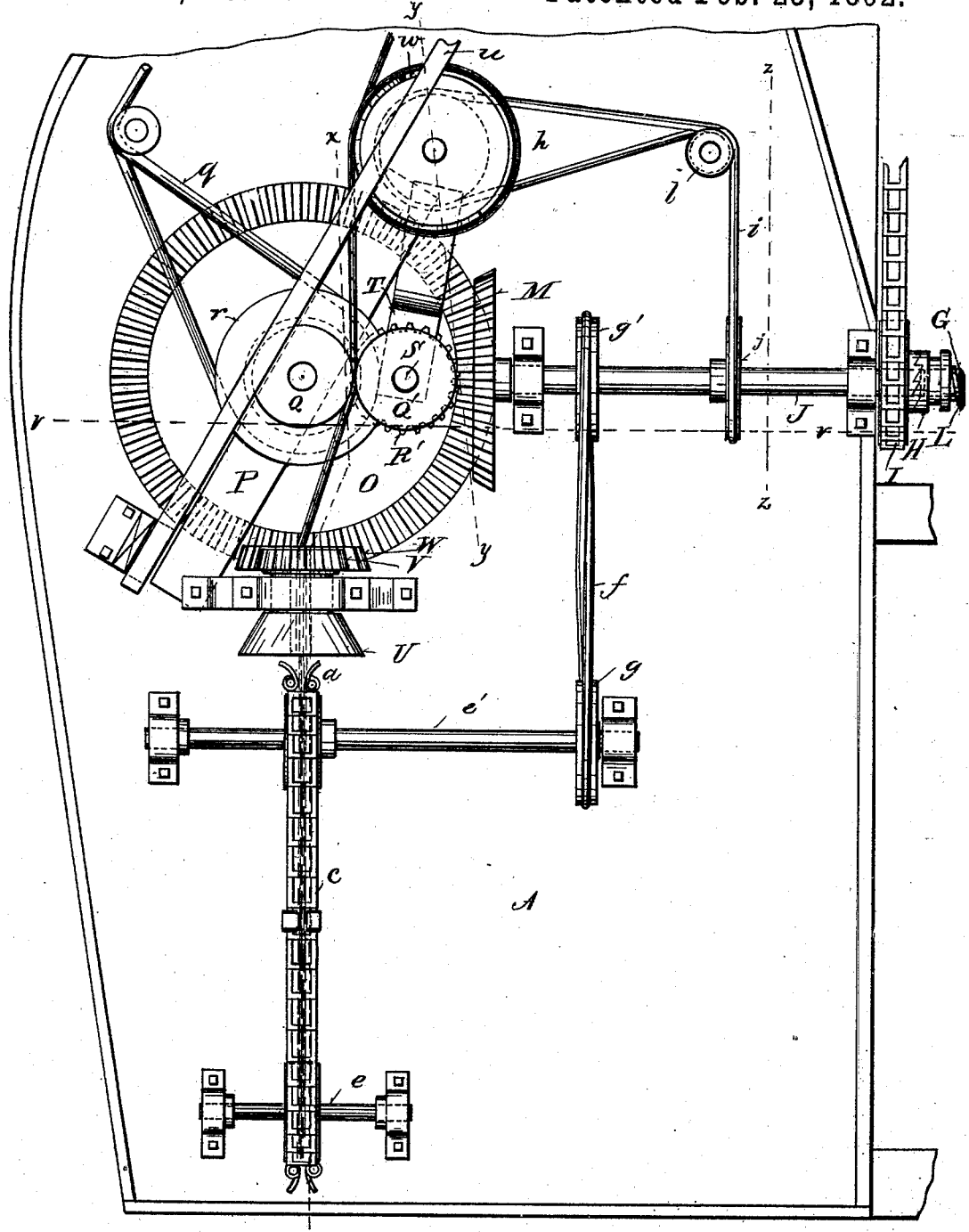

(No Model.) 8 Sheets—Sheet 1.
P. D. SMITH.
GRAIN BINDER.
No. 469,279. Patented Feb. 23, 1892.
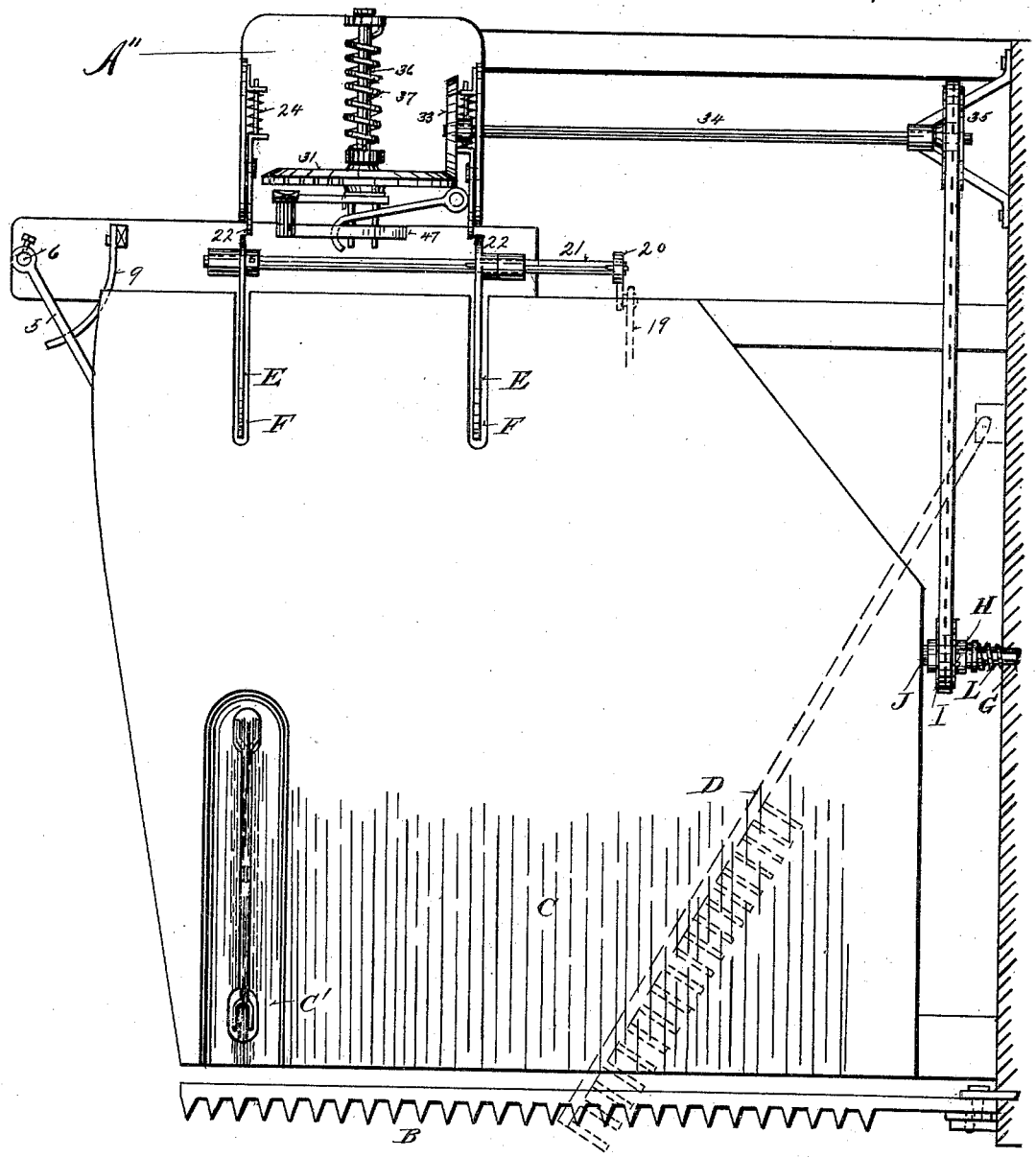
Fig. 1.
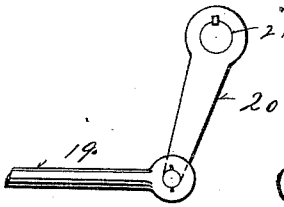
Fig. 1ª
WITNESSES
H. M. Plaisted
J. G. Dawley
INVENTOR
Peter D. Smith
By H. A. Toulmin
His Attorney.

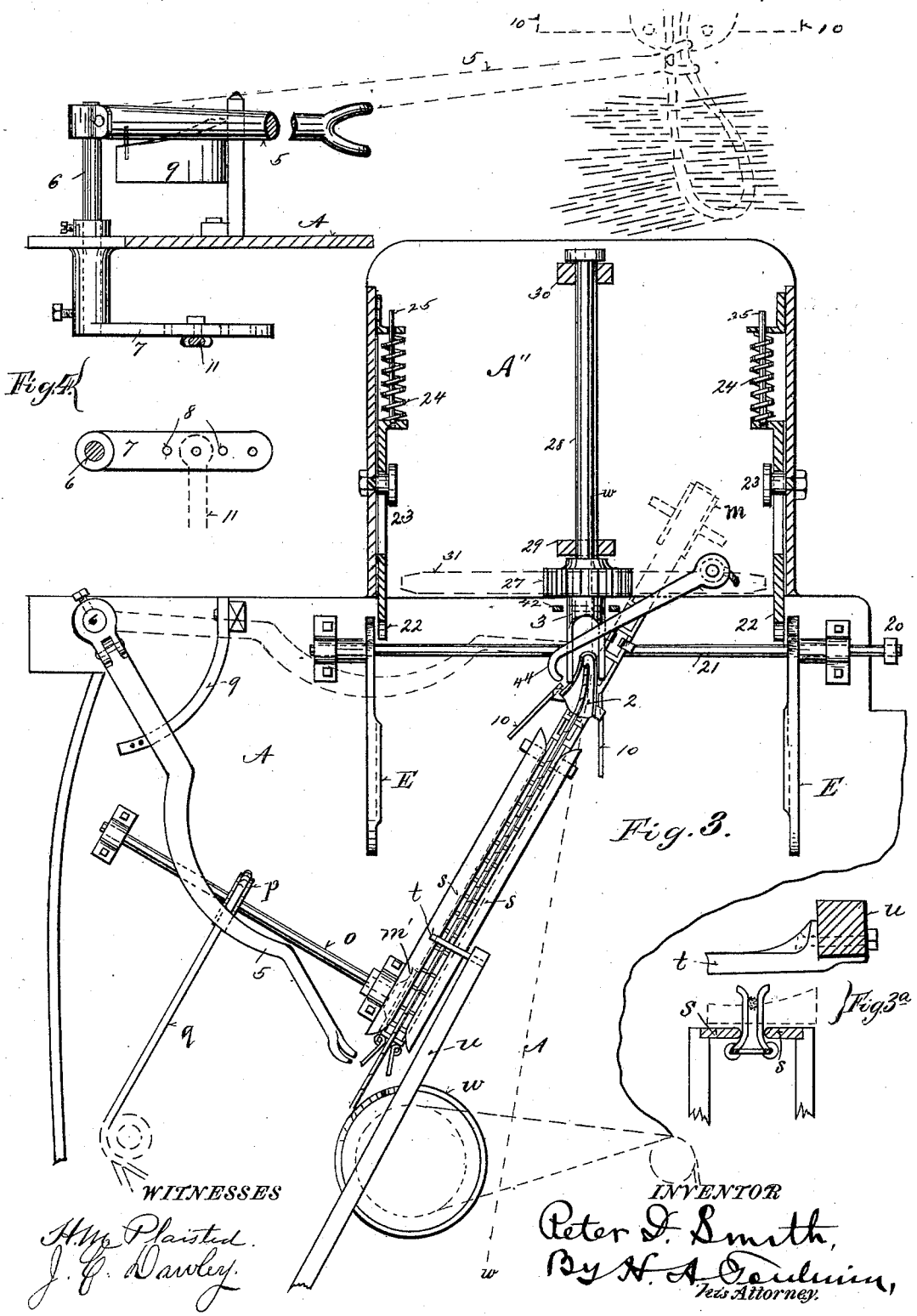

(No Model.) 8 Sheets—Sheet 4.
P. D. SMITH.
GRAIN BINDER.
No. 469,279. Patented Feb. 23, 1892.
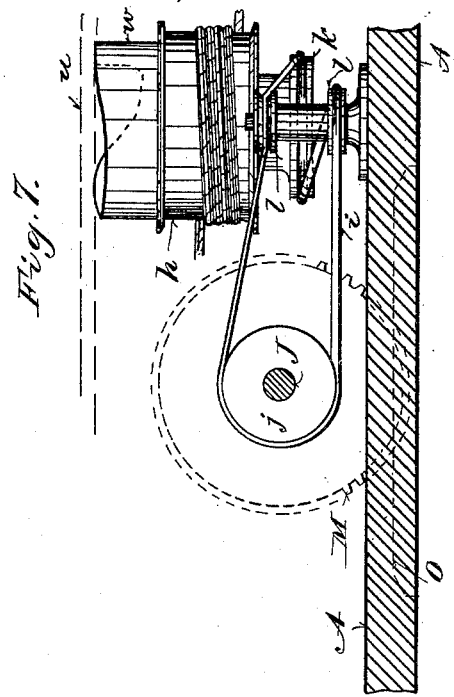
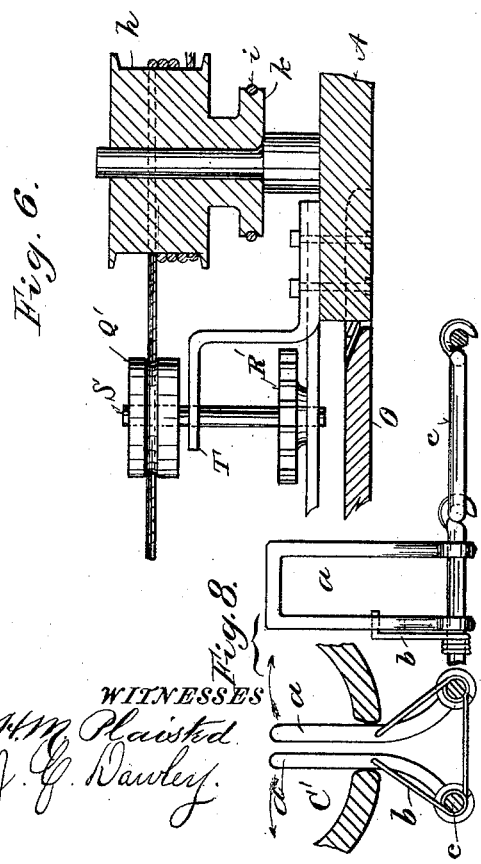
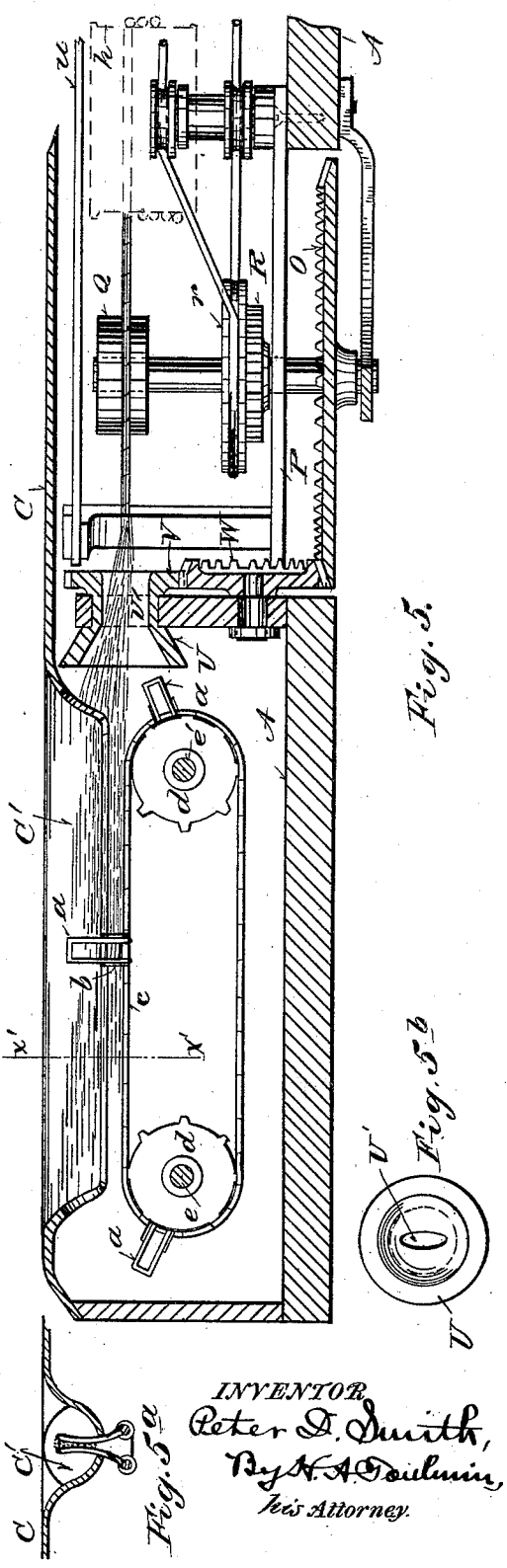
WITNESSES
H. M. Plaisted
J. C. Dawley
INVENTOR
Peter D. Smith,
By H. A. Toulmin,
his Attorney.

(No Model.) 8 Sheets—Sheet 5.
P. D. SMITH.
GRAIN BINDER.
No. 469,279. Patented Feb. 23, 1892.
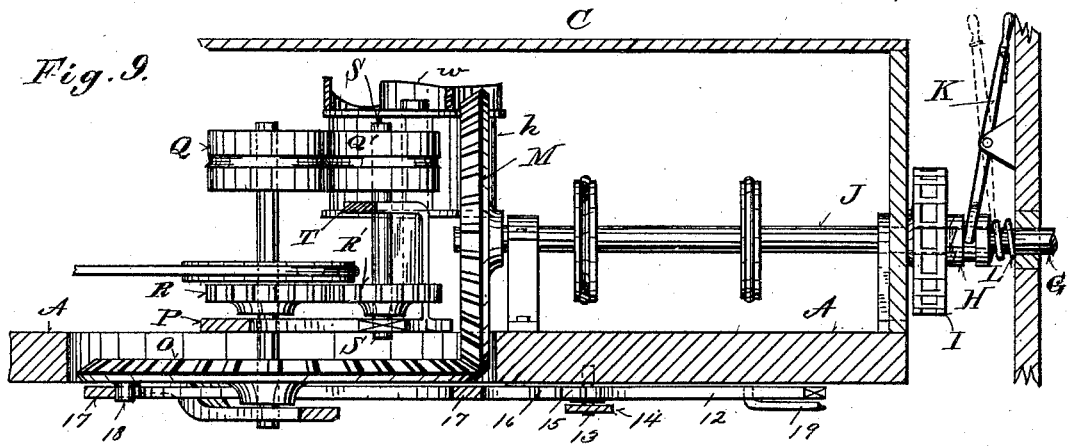
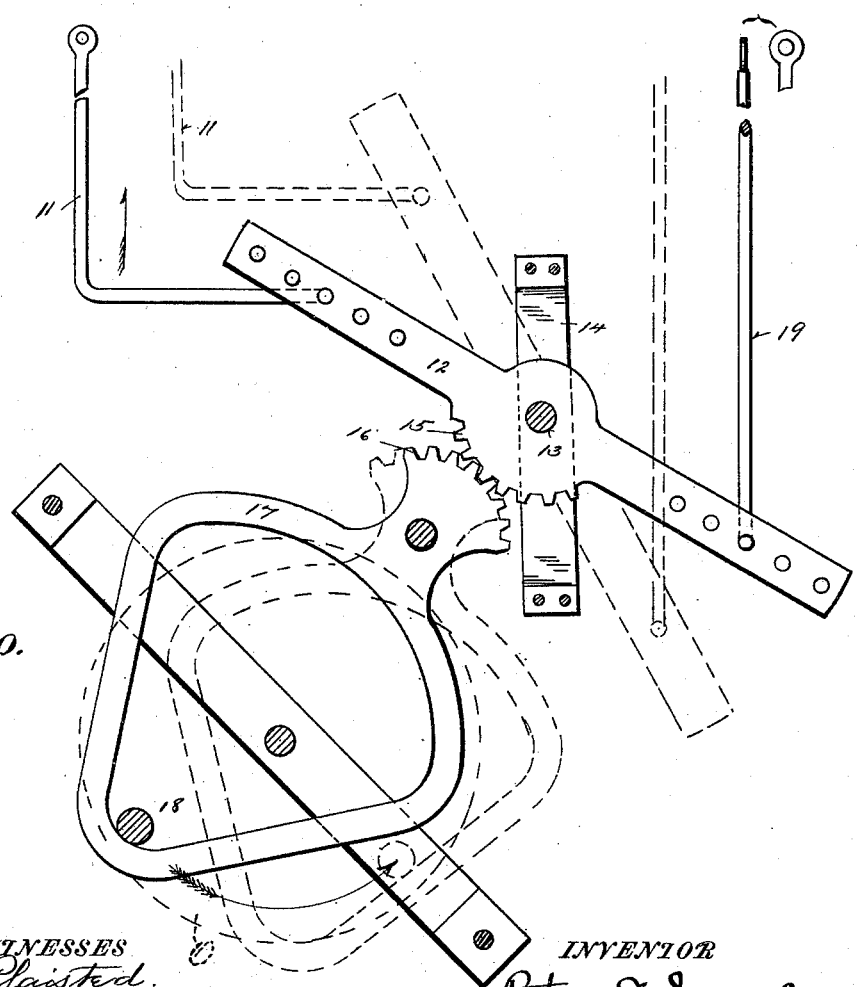
WITNESSES
INVENTOR
Peter D. Smith,
By H. A. Toulmin,
his Attorney.

(No Model.) 8 Sheets—Sheet 6.
P. D. SMITH.
GRAIN BINDER.
No. 469,279. Patented Feb. 23, 1892.
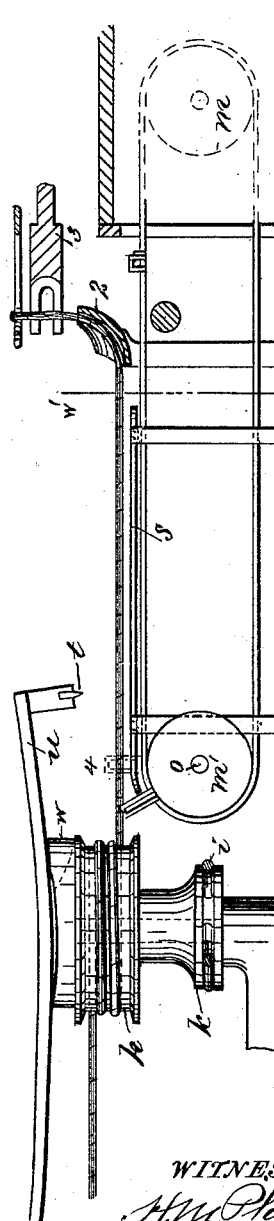
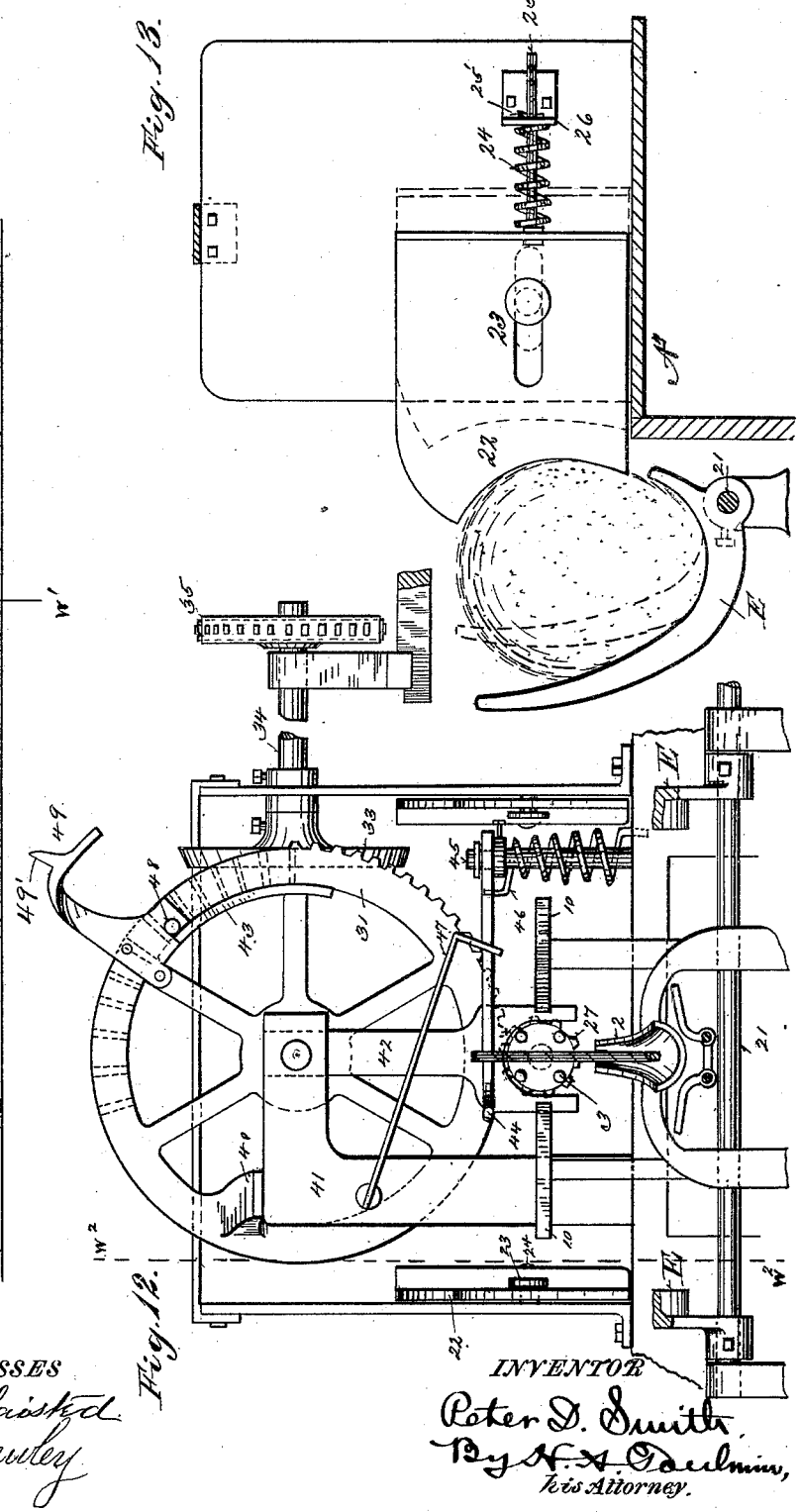
WITNESSES
INVENTOR
Peter D. Smith
By H. A. Toulmin,
his Attorney.

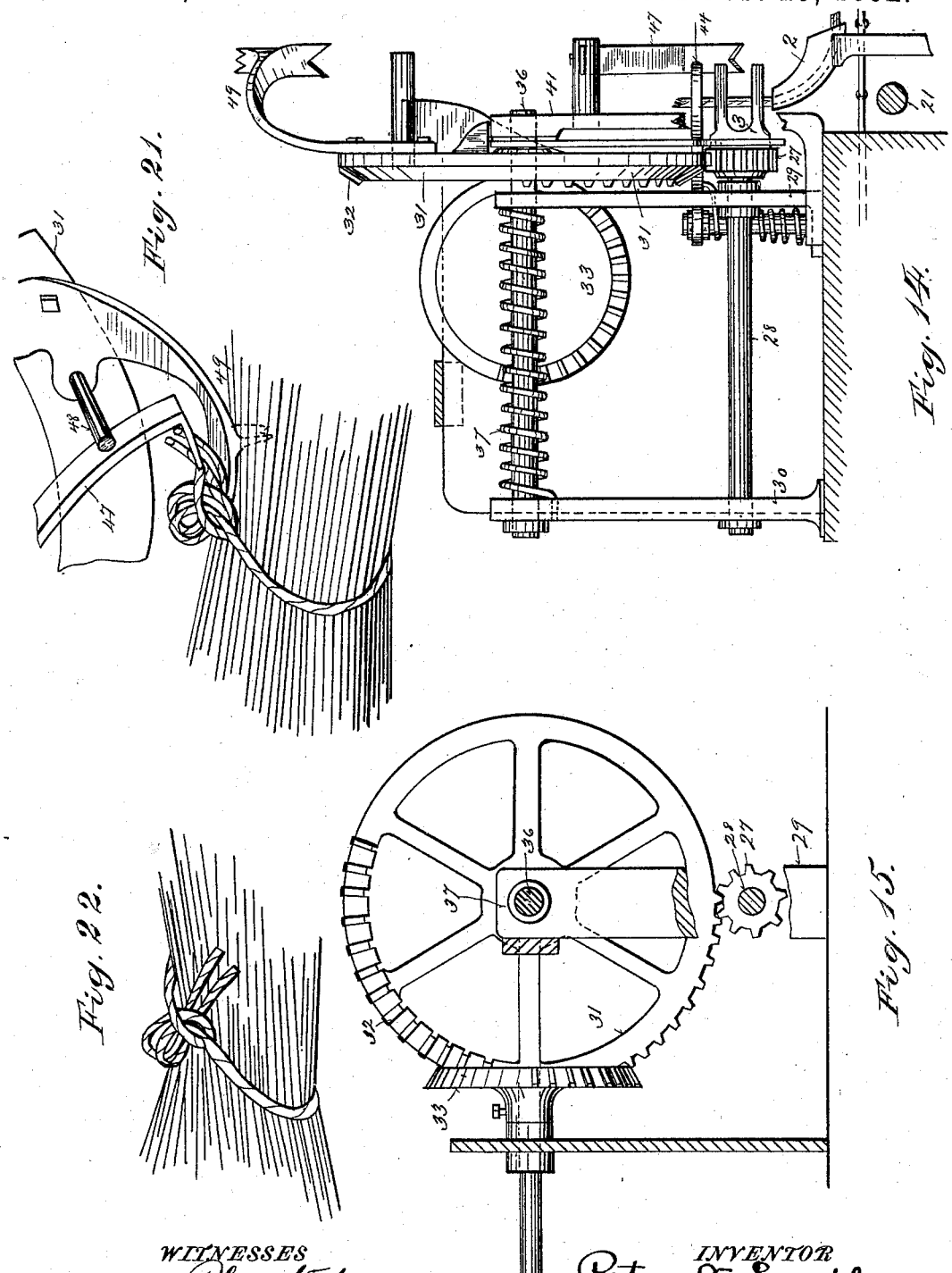

(No Model.)
8 Sheets—Sheet 8.
P. D. SMITH.
GRAIN BINDER.
No. 469,279.  Patented Feb. 23, 1892.
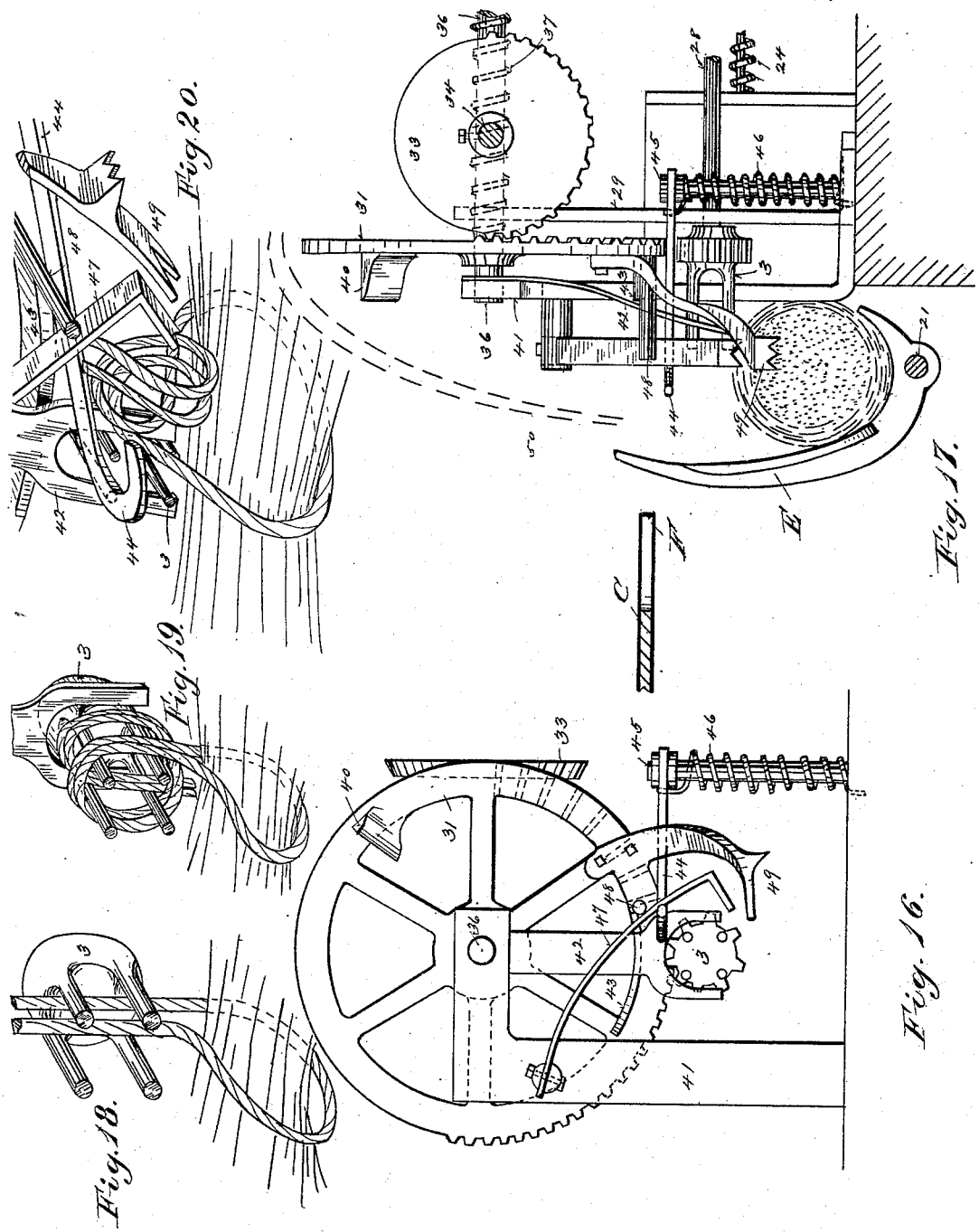
WITNESSES
INVENTOR
Peter D. Smith
By H. A. Toulmin
his Attorney

UNITED STATES PATENT OFFICE.

PETER D. SMITH, OF SPRINGFIELD, OHIO.

GRAIN-BINDER.

SPECIFICATION forming part of Letters Patent No. 469,279, dated February 23, 1892.

Application filed May 22, 1891. Serial No. 393,750. (No model.)

*To all whom it may concern:*

Be it known that I, PETER D. SMITH, a citizen of the United States, residing at Springfield, in the county of Clark and State of Ohio, have invented certain new and useful Improvements in Grain-Binders, of which the following is a specification, reference being had therein to the accompanying drawings.

My invention relates to certain new and useful improvements in grain-binders.

My improvements have reference to means for forming a binding-rope for the sheaf from a wisp or portion of the cut grain and a clamping mechanism and carrier adapted to clamp and carry onward a suitable amount of grain to form said rope, have reference to a winding measuring-drum adapted to deliver the length of rope to bind a sheaf, have reference to a cutting mechanism to sever a suitable length of rope and a cam to actuate said mechanism, have reference to a rear end carrier for said cut rope and to a special form of the same adapted to carry the rear end forward into proximity with the forward end of said rope, have reference to a knotter-fork and its operative mechanism adapted to receive and twist the ends of said binding-rope, and have reference to other points of construction hereinafter described, and pointed out in the claims.

In the accompanying drawings, forming a part of this specification, and on which like reference letters and figures represent corresponding parts, Figure 1 represents a plan view of my machine applied to a reaper of any suitable style, preferably of the drop-rake style, as indicated in dotted lines thereon; Fig. 1$^a$, a binding-shaft crank and connecting-rod; Fig. 2, a plan view of a portion of the machine with the platform or cover removed; Fig. 3, the succeeding portion of the machine in plan similar to Fig. 2; Fig. 3$^a$, a detail of the cutting-knife and rope-carrier with the operating-guides; Fig. 4, a detail of a form of carrier for the rear end of the binding-rope, a plan of its operating crank-arm, and a dotted position of the pivot-arm in connection with the binding-rope and fork; Fig. 5, a section on the line $x$ $x$ of Fig. 2 through the twisting mechanism; Fig. 5$^a$, a cross-section of the inclined guards on the line $x'$ $x'$ of Fig. 5; Fig. 5$^b$, a face view of the twister; Fig. 6, a section through the winding-drum on the line $y$ $y$ of Fig. 2; Fig. 7, a section on the line $z$ $z$ of Fig. 2, showing the manner of operating the said drum; Fig. 8, a detail view of the spring-clamps and carrier-chain; Fig. 9, a section on the line $v$ $v$ of Fig. 2, showing the feed-drums and operative mechanism; Fig. 10, a plan view of a heart-shaped cam and adjunctive devices to operate the pivoted carrier-arm and the binding-shaft; Fig. 11, a line section on $w w$ of Fig. 3 alongside the winding-drum and cutting mechanism; Fig. 12, a front elevation of the knotting mechanism, the section being taken on the line $w'$ $w'$ of Fig. 11; Fig. 13, a section on line $w''$ $w''$ of Fig. 12, looking to the left; Fig. 14, a similar view on the same line looking to the right; Fig. 15, a rear view of the knotter-wheel, its pinion, and driving-gear for said wheel; Fig. 16, a front view of the knotting mechanism, the parts being shown in position to tie the knot; Fig. 17, an edge view of the same with the sheaf and crook-arms therefor; Fig. 18, a detail view of the knotter-fork with the ends of the binding-rope in position to be twisted; Fig. 19, a similar detail showing the knots twisted and the shifting-yoke in position to throw the coil from the fork; Fig. 20, another detail showing the knot ready to be tucked under the band or rope itself; Fig. 21, a similar view with the knot formed by the tucker and the latter in position to throw out the sheaf; and Fig. 22, a detail of a portion of the sheaf with the knot drawn tight by the expansive action of the grain.

The letter A designates the bottom or base of my machine, connected to and supported by the reaper in any suitable manner, directly to the rear of the cutter-blade B, adapted to reciprocate in the usual manner.

The letter C designates the platform or cover for my machine and adapted to receive the grain as it is cut and falls thereon. The usual drop-rake D (indicated by the dotted lines) sweeps across the said platform C at suitable periods and rakes the collected grain into the packing or crook arms E E, operating in slots F in said platform and adapted to receive and hold the grain thus formed into a sheaf, as will hereinafter be fully described.

The main shaft G of the reaper is connected by a ratchet-clutch, consisting of a featherkeyed sliding piece H, normally engaged with a ratchet-face of a sprocket I, mounted on a secondary shaft J, thus constituting an extension of the main shaft G. A handle K, Fig. 9, is adapted to slide said clutch H out of its normal engagement with its matching member by means of a yoke and engaging with a groove in said clutch, as shown in Figs. 2 and 9. A spring L is adapted to preserve the normal engagement of said clutch with the secondary shaft J, but allows of instantly breaking said engagement through said handle K, and thus stopping the operation of the binder. The ends of the main shaft G and secondary shaft J may be simply brought end to end and the operative connection formed by said clutch or any other suitable means. The shaft J is supported in bearings on said base A and carries the driving-gear M, meshing with a master-wheel O, supported in bearings P and preferably in a horizontal position, the shaft of said master-wheel carrying a feed-drum Q and a feed-gear R, matching and gearing with a drum and gear Q' R', respectively, mounted on a shaft S, supported by suitable brackets T, whereby the feed-drums Q Q' rotate in opposite directions and draw upon the binding-rope, as will presently be described.

The twister U, Figs. 2 and 5, consists of a tapering or dish-faced piece having an elliptical or elongated opening U' therein, Fig. 5$^b$, and provided with a pinion V, connected to the master-wheel by an idler W, as shown in Fig. 5, whereby the rotation of said master-wheel will cause the twister to rotate also, and by means of the elliptical opening any material passing through the same will be twisted into a rope. If desired, the idler-pinion W may be disposed of and the twister geared directly to the master-wheel. The grain is delivered to the twister by means of the clamps $a$, pivotally mounted on a carrier-belt $c$, preferably of the chain-link variety and kept in a normally-open position by means of a spring $b$, engaging with each clamp $a$ and acting to throw them open in the direction of the arrows, Fig. 8. The belt $c$ is mounted on sprocket-wheels $d$, carried by shafts $e$ $e'$, to the latter of which rotation is given through a belt or cord $f$, connecting pulleys $g$ $g'$, mounted on the shaft $e'$ and driving-shaft J, respectively. An opening or slot C', preferably sunk or inclined, as shown in Figs. 5 and 5$^a$, is formed on the deck or platform in order to facilitate the collection of the grain continually dropping on the platform C at the bottom or edges of said slot, which edges are wide apart at each end of the slot, but approach each other in the intermediate portions, as shown in Fig. 1, whereby the traveling clamps $a$ will enter the forward end of the slot in their open position and be closed upon the deposited grain by said edges, as shown in Figs. 5$^a$ and 8, in order to convey the grain thus gripped in a continuous stream into the flared end of the said twister U. The clamps will release the grain as they arrive at the rear end of the slot C' and in close proximity to the entrance to the twister. The clamps, being below the surface of the platform, will not obstruct the passage of the drop-rake D in its periodical passage across the platform in forming the sheaf. The inclined form also prevents the grain from being entirely swept from the clamping mechanism at the passage of the rake, and thus prevents any break in the continuity of the twisted rope. In places where the ground is bare or when the supply of grain is diminished for some reason the driver can readily stop the operation of the binder by throwing the clutch H to its inoperative position. The grain after twisting is drawn on by the feed-drums before mentioned and wound up on a winding or measuring drum $h$ preferably four or five times to prevent slipping, from which drum it is delivered to another carrying mechanism. The rotation of the winding-drum is effected by a connecting belt or cord $i$ from a driving-pulley $j$, mounted on the shaft J and guided to the drum-pulley $k$ by guiding pulleys or drums $l$. If desired, however, the winding-drum may be so placed as regards the shaft J as to do away with the guiding-pulleys $l$.

A second carrying mechanism, consisting of spring-clamps and carrier-belt similar to those previously described, is mounted on pulleys $m$ $m'$, the latter carried by a shaft $o$, suitably mounted, and having a pulley $p$, connected by a belt or cord $q$ to a pulley $r$, mounted on the shaft of the master-wheel, Figs. 2 and 9, or otherwise, whereby motion is given to the secondary carrier. As the binding-rope is delivered from the winding or measuring drum, the clamps on this carrier are adapted to engage therewith by passing between gripping edges or guides $s$, which act in the same manner to close the clamps as the edges of the inclined slot C', above mentioned. The circumference of the winding-drum is preferably of such length as to furnish at every rotation a suitable length of rope to bind one sheaf of grain when severed by a suitable cutting mechanism, now to be described. If desired, however, the measuring-drum may be of other size than as just stated and be geared to give the same result.

The cutting mechanism preferably consists of a knife $t$, mounted on an arm $u$ of a spring or spring-actuated construction, which is adapted to be raised to the position shown by full lines in Fig. 11 by the action of a cam $w$, mounted on the winding-drum $h$, or otherwise adapted to elevate said knife and allow its descent upon the binding-rope at suitable intervals to cut off successive lengths to bind the sheaves. As seen from Fig. 3$^a$, the binding-rope is held firmly by the spring-clamps of the carrier and the knife-blade preferably acts slightly in advance of one of said clamps. The rope is not cut, therefore, until it is held by a clamp between the winding-drum and the point of severance, as indicated in Fig. 11.

This clamp will maintain its grip on the forward end of the binding-rope relatively to its motion and deliver it to a guide 2, adapted to guide it into the knotter-fork 3, to be presently described. The forward end of the rope being in the fork and another clamp in engagement with the rope, as shown by the dotted lines at 4 in Fig. 11, the knife $t$ is again operated by the cam $w$ or otherwise to sever the rope in front of said clamp, as above described. The rear end of this severed portion or band is now to be brought into the fork, together with the forward end, the drop-rake having acted meanwhile to deliver the sheaf upon said band in position to be bound.

To bring the two ends of the severed portion or band together in the knotter-fork preparatory to the knotting action, I employ a carrier for said rear end, preferably consisting of an arm 5, adapted by a fork or otherwise to engage with said rear end of the band and at the other end pivotally mounted on a shaft 6, supported by the base A, or in any other convenient manner, and provided with a crank 7, set-screwed upon its lower end, having holes 8 therein, whereby the length of the crank-arm is varied. The guiding cam or rest 9, Figs. 3 and 4, is adapted to support the pivoted arm 5 and raise it to the position shown in dotted lines in Fig. 4 as it is thrown forward to bring the rear end into the knotter-fork. Guiding-wings 10 on either side of the knotter-fork 3 assist the carrier 5 in placing the rear end of the band in position in the knotter-fork. Other guiding means may be employed to effect said result. The inclination of the cam-rest 9 is adapted to elevate the carrier-arm above the sheaf, as indicated in Fig. 4. This forward movement of the carrier-arm is effected through a link-rod 11, pivoted to the said crank 7 at one end and at the other to a lever 12, fulcrumed on an axis 13, carried by a bracket 14, secured to the under side of the base A or other part of the machine. This lever is provided with a gear-segment 15, Fig. 10, meshing with a matching segment 16, forming part of a heart-shaped cam 17 or other convenient form, adapted to be operated at suitable intervals by a stop or pin 18, carried by the master-wheel O, Fig. 9. The rotation of the master-wheel in the direction of the arrow carries the stud around with it and throws the cam to the dotted position shown in Fig. 10, thus vibrating the lever 12 through its gear connection therewith and throwing the link 11 forward in the direction of the arrow, and also the carrier-arm 5, connected therewith by the crank and shaft 7 and 6, respectively. The cam 17 is thrown to its former position and the carrier-arm 5 returned after the stud 18 passes through a certain arc of its rotation without action on the cam 17, during which time the cam is at rest. It is during this inoperative period of the cam that the knot is tied in the band, as will presently be described.

The crook-arms E, before mentioned, are adapted to firmly hold and compress the sheaf while the knot is being tied in the band or severed portion of the rope. This is effected by means of a link connection 19, engaged at one end with the opposite end of the lever 12, to which the link 11 is engaged, and at the other end to a crank 20, Figs. 1 and 1ª, mounted on a binding-shaft 21, supported by suitable bearings and carrying the said crook-arms E. These arms are keyed or set-screwed or otherwise adjustably mounted upon said shaft 21 to vary their action on the sheaf delivered to them. The effect of the link connections 11 and 19 is also varied by adjusting them at different distances from the fulcrum 13 by means of the holes in said lever 12, as shown in Fig. 10. The proper amount of throw for the carrier-arm 5 and crook-arms E may thus be secured. In cutting the grain, however, some portions of the field will be more fruitful than others and the grain therefore be more abundantly deposited upon the platform C, resulting in larger sheaves being delivered to the crook-arms by the drop-rake. In order to compensate for different sizes of sheaves and also to compress these larger sheaves to substantially the size required for the length of band I have provided opposing edges, constituting yielding abutments or sheaf-formers 22 substantially opposite the crook-arms E and slidingly mounted by means of a slot and pin 23 or otherwise to adapt them to be forced backward by the action of the arms E on the inclosed sheaf, as indicated in Fig. 13. This pressure is resisted, however, in each slide by a spring 24, mounted on a spindle 25, engaged with the rear of said slide and projecting through a bracket or stop 26, against which the spring exerts its pressure in resisting the action of the arms E, and thus compresses the sheaf the more strongly the greater the amount of grain constituting the latter and yields to compensate for the larger size and prevent breakage. When a small amount of grain forming a small sheaf is delivered to the said arms E, the slides or formers 22 will not be driven backward, as the pressure will not be sufficient to overcome the outward tendency of the spring. Thus the backward action of the slides or yielding abutments prevents breakage of the crook-arms when a large sheaf is delivered to them, while it also compresses said sheaf into approximately the same size as a sheaf containing less grain, but not as strongly compressed. The arms E retain the sheaf under compression during the operation of tying the knot in the band, and are opened to discharge or eject the sheaf simultaneously with the return of the carrier-arm 5 when the heart-shaped cam 17 is returned after its inoperative or silent period in which the stud 18 traverses the wider portion of the cam, as previously mentioned.

I will now describe the operation and means of tying a knot in the band or severed portion of the rope while the sheaf is held in its compressed condition. The knotter-fork 3, previously referred to, is preferably four-pronged, as shown in Fig. 12, &c., to facilitate the entrance of its ends of the band between the forks. The fork is provided with a pinion 27, carried on a shaft 28, supported in the front and rear bearings 29 and 30, respectively. The distance between the bearings is preferably considerable to avoid obstructing the operation of the shaft 28. Meshing with the pinion is a knotter-wheel 31, provided with a gear-segment 32, adapted to mesh with a driving-gear 33, having a portion of its face smooth and mounted on a counter-shaft 34, driven by a sprocket-wheel 35, belted to the driving-sprocket I on the driving-shaft J, whereby the said gear 33 rotates continuously, but has only an intermittent effect on the knotter-wheel by reason of the smooth untoothed portion of the former-wheel, which rotates without rotating the knotter-wheel. The knotter-wheel is mounted on a shaft 36, provided with a spring 37, one end of which is secured to the shaft and the other end to a post or other fixed part, whereby the return of the knotter-wheel to its former position after rotation by the gear 33 is effected, when the smooth portion of the latter wheel is reached. A stop 40, carried by the said wheel, engages with a post 41 in the normal position of the knotter-wheel. By this rotation of the knotter-wheel and pinion the ends of the band inserted in the fork, as shown in Figs. 4 and 18, are twisted or coiled, as represented in Fig. 19, and must be shifted from the fork before the return motion of the knotter-wheel. This is effected by a shifter consisting, preferably, of a spring-yoke 42, conveniently carried by said post 41, and embracing at its bifurcated end the knotter 3 in readiness to shift the twisted ends therefrom, as shown in Fig. 19. A cam 43, extending outward from the face of the knotter-wheel, is adapted to engage with said shifter near the end of the forward motion of the wheel and force the shifter outward, in order to shift the twisted ends therefrom before the return motion of the wheel and pinion. The hook-arm 44, located in proximity to the knotter-fork and pivotally mounted on a stud 45, is provided with a spring 46, secured at one end to said hook and at the other to a fixed part, whereby the normal tendency of the hook-arm 44 is backward against the shifter 42. The outward motion of the shifter will also force the hook-arm outward and retain the twisted ends in position when they are shifted from the fork in readiness to be engaged by a spring knot-holder 47, carried by the post 41 and adapted to be engaged by a pin 48 on the knotter-wheel and forced downward to receive the knot from the hook-arm 44 and hold it in a lower position in readiness to be engaged by a tucker 49, carried by the knotter-wheel, which follows up the spring knot-holder 47, as shown in Fig. 20, and tucks the knot under the band, as shown in Fig. 21. In doing this the barb or hooked projection 49' is bedded in the sheaf, as shown in Fig. 21. The return motion of the heart-shaped cam before described now takes place, releasing the sheaf from the compression of the arms E and allowing it to expand and tighten the band and complete the knot, as shown in Fig. 22. At the same time the backward motion of the knotter-wheel takes place, because, as before mentioned, the geared portions of the wheel and gear have reached their limit and the smooth portion of the gear 33 allows the return of the wheel 31 under the tension of its spring 37, carrying with it the tucker 49, the barb projection of which being bedded firmly in the sheaf, throws the latter out of the hook-arms and ejects it from the machine at one side of the knotter-platform A" and upon the ground preferably. The machine thus continues its operation, first, by bringing the forward end of the succeeding band into its position in the knotter 3, then raking the sheaf into the wide-open arms E, while the proper length of band is being cut by the cutting mechanism, and the rear end brought up into the knotter-fork by the carrier-arm, and the crook-arms E are simultaneously compressing the sheaf against the yielding abutments or sheaf-formers in readiness for the twisting action of the knotter-fork as soon as the smooth portion of the gear 33 has rotated, and thereby brought its geared portion into engagement with the matching gear-segment on the knotter-wheel to rotate the knotter-fork and shift the twisted ends therefrom and hold and tuck them under the band, as previously described and illustrated, the sheaf being discharged or ejected on the return motion, and so on successively.

In order to prevent the rake from throwing the loose sheaf into the knotting mechanism, a shield 50 (indicated by dotted lines in Fig. 17) is provided for the front of the knotting mechanism, or any other suitable guiding means may be employed. It will be observed that the platform or cover C protects the machinery from the action of the weather, and the mechanism may be instantly stopped or silenced completely at any part of its operation by simply unclutching the extension J of the main shaft by manipulating the handle K to throw the clutch out of its normal position; also, it will be observed that a backward rotation of the driving-shaft will cause no damage to the binding mechanism, since the ratchet form of engagement prevents said backward motion of the driving-shaft from being communicated to the shaft J. The spring 24, acting to force outward its yielding abutment or sheaf former or slide 22, is checked in its outward motion by any suitable means—such as a pin 25'—inserted in the spindle 25 by means of holes in said spindle at various portions of its length. The spring will thus be more or less compressed and the slide or sheaf-former drawn backward to allow of a larger-sized sheaf being received.

Fig. 12 shows the knotting parts in their open position, the knotter-pinion being engaged with the forward end of the toothed portion of the wheel and the spring holder and tucker both in their elevated position.

Fig. 16 merely shows the position of these parts in their lower position, the sheaf and band not being shown in this figure in order to clearly illustrate the position of the parts.

Figs. 20 and 21, however, clearly illustrate the means and method of forming the knot, which on drawing up by the expansion of the sheaf assumes the position shown in Fig. 22.

Referring to the yielding abutments, it is to be noted that while they act compressively on the sheaf within the packing-arms, yet their chief function is to prevent the breakage of said arms or other portions of the machine, which is liable to occur in case a large sheaf is thrown into said arms unless some yielding device is employed. For instance, if a large amount of grain be thrown into the packing-arms the said arms will be operated to their predetermined limit, as if but a small amount of grain formed the sheaf and if the compression be sufficiently great fracture of the mechanism may occur. Said yielding abutments, however, are forced backward when a large sheaf is compressed by the packing-arms, and by said yielding action they prevent the breakage which might otherwise occur, while at the same time they aid in reducing the size of the sheaf to accord with the length of binding-band to be tied around it.

The knotting mechanism may be placed in any convenient position thereon other than as illustrated, and any suitable raking means other than a drop-rake may be used to deliver the sheaf to the packing-arms.

In this specification the term "belt and chain" is to be taken as representing their equivalents, such as ropes and gears.

It is to be remarked that the straw rope when begun is to be wound around the winding-drum and engaged with the second clamping-carrier by hand to prepare the machine for the automatic action. The driver has control of the binding mechanism, as above described, and can stop or silence the whole binding mechanism at will, when necessary, to prevent the non-formation of the rope due to the scarcity of grain. The rope may thus be formed continually. The clamps of the first carrying mechanism will take only a sufficient quantity of grain from the platform to form the rope, no matter what the amount of superimposed grain may be.

Any suitable means adapted to cut off a length of rope sufficient to go around a sheaf and be tied may be employed in place of the measuring-drum and cutting mechanism hereinbefore described.

Having thus fully described my invention, what I claim as new, and desire to secure by Letters Patent, is—

1. In a grain-binder, the combination, with a cutter-bar and a rake, of a platform for the cut grain to fall upon having a slotted opening, clamping carrying means adapted to take portions of grain through said opening, a twister consisting of a revoluble piece having an elongated transversely-flattened opening adapted to receive the grain and twist it into a rope during its passage, a winding and measuring drum for said rope, driving means for said twister and drum, a cutting mechanism to cut off a suitable binding length of rope when measured off by said drum, packing-arms to receive the sheaf raked from said platform, guiding and carrying means to place the said binding length about the said sheaf, and a knotting mechanism to secure the ends of said rope in a knot while the sheaf is held by said arms.

2. In a grain-binder, the combination, with a cutter-bar and a platform for the cut grain to fall upon, having a slotted opening inclined downward to the edges thereof, of a carrier-belt and clamps thereon adapted to extend through said opening and be compressed by said edges to clamp the inclosed grain, and means to operate said carrier.

3. In a grain-binder, the combination, with a cutter-bar and a platform for the cut grain, of a clamping carrying mechanism adapted to take a portion of the grain therefrom, a twister consisting of a revoluble piece having a transversely-flattened opening and a guiding-face adapted to receive the grain from said mechanism and twist it in its passage through said opening, and means to operate said twisting and carrying mechanism.

4. In a grain-binder, the combination, with a driving-shaft, of a revoluble twister, a clamping-carrier to deliver grain thereto, a winding and measuring drum adapted to receive the twisted grain-rope from said twister and measure it off in suitable binding lengths, a second clamping-carrier to take the said rope from said winding-drum and carry it to the sheaf, cutting means to divide said rope when measured off in said binding lengths by said drum, and operative connections between said driving-shaft and the said twister, both the carriers, the winding-drum, and the cutting means, respectively, whereby they are operated relatively to each other.

5. In a grain-binder, the combination, with a driving-shaft, of a clamping-carrier for a binding-rope and means to deliver it thereto, a knife to cut said rope, a swing-arm adapted to engage with the rear end of the severed portion and carry it forward, and intermediate connections between said driving-shaft and the said knife and swing-arms, respectively, to operate them relatively to each other, and knotting mechanism to receive the ends of the severed portion of said binding-rope.

6. In a grain-binder, the combination, with a rotatable shaft and packing-arms thereon, of a pivoted swing-arm forming a rear end carrier for a binding-band, cranks for said arm and shaft, respectively, a double-armed adjustable lever having a gear-segment, link connections from said cranks to said lever at opposite ends thereof, a pivoted cam adapted to intermittently vibrate on its pivot and having a gear-segment meshing with said double-lever segment, a master-wheel having a stud or projection adapted to engage with said cam, and means to operate said master-wheel, whereby the said swing-arm and packing-arms will be operated back and forth intermittently.

7. In a grain-binder, the combination, with a knotter-fork to coil the ends of a binding-band delivered thereto, a pinion for said fork, a wheel to operate said pinion, and a driving-gear having a toothed and a smooth segment adapted to rotate said wheel intermittently, of a spring-shifter to throw said coiled band off said fork, means to actuate said shifter, holding devices to retain said coiled ends in position after being shifted, and a tucker carried by said wheel to tuck said coiled ends under the band to complete the knot.

8. In a grain-binder, the combination, with a rotatable knotter-fork adapted to coil the ends of a binding-band inserted therein and having a pinion, a shaft, and a knotter-wheel meshing with said pinion, of a driving-gear having a smooth and a toothed segment adapted to effect an intermittent rotation of said wheel in one direction, a spring coiled about said knotter-wheel shaft to effect the return of the wheel at the limit of its forward rotation, a shifter adapted to throw said coiled ends from said fork, a cam carried by said wheel and adapted to actuate said shifter at the end of its forward rotation, and adjunctive devices to hold said ends and complete the knot, whereby the coiled ends are shifted from said fork before the reverse movement of the wheel.

9. In a knotting mechanism, the combination, with a rotatable knotter-fork, its pinion, and means to operate it to coil the ends of a binding-band delivered to said fork, of a shifter consisting of a spring-yoke embracing said fork, a cam on said wheel to actuate said shifter, a pivoted hook-arm actuated by said shifter, adapted to hook the shifted coil, a spring to return said hook-arm, a spring holding device to take the said ends from said hook-arm, a pin on said wheel to actuate said device with said shifter, and a tucker carried by said wheel, adapted to follow up said holding device and tuck the coiled ends of the band under the band itself.

10. In a grain-binder, the combination, with a wheel, means to rotate it intermittently in one direction, and a spring to effect its return at the limit of its forward rotation, of a barbed projection carried by said wheel and adapted to engage with a sheaf at the limit of its forward rotation, whereby the sheaf will be ejected on the return movement of said wheel under the influence of said spring.

In testimony whereof I affix my signature in presence of two witnesses.

PETER D. SMITH.

Witnesses:
OLIVER H. MILLER,
CLARK A. WISEMAN.